United States Patent
Choudhary et al.

(10) Patent No.: US 11,321,114 B2
(45) Date of Patent: May 3, 2022

(54) HYPERVISOR ASSISTED APPLICATION VIRTUALIZATION

(71) Applicant: VMware, Inc., Palo Alto, CA (US)

(72) Inventors: Jairam Choudhary, Los Altos, CA (US); Arun Passi, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 300 days.

(21) Appl. No.: 16/517,426

(22) Filed: Jul. 19, 2019

(65) Prior Publication Data
US 2021/0019164 A1   Jan. 21, 2021

(51) Int. Cl.
*G06F 9/455* (2018.01)
*G06F 16/188* (2019.01)
*G06F 9/451* (2018.01)

(52) U.S. Cl.
CPC .......... *G06F 9/45558* (2013.01); *G06F 9/452* (2018.02); *G06F 16/188* (2019.01); *G06F 2009/45579* (2013.01)

(58) Field of Classification Search
CPC .... G06F 9/45558; G06F 9/452; G06F 16/188; G06F 2009/45579
See application file for complete search history.

(56) References Cited

U.S. PATENT DOCUMENTS

| | | | |
|---|---|---|---|
| 9,569,446 B1* | 2/2017 | Feathergill | ............ G06F 16/188 |
| 10,705,756 B2* | 7/2020 | Patwardhan | .......... G06F 3/0671 |
| 2010/0241654 A1* | 9/2010 | Wu | ........................ G06F 16/188 707/769 |
| 2013/0014110 A1* | 1/2013 | Doyle | ...................... G06F 9/455 718/1 |
| 2020/0053123 A1* | 2/2020 | Pliskin | ................ H04L 63/1491 |

OTHER PUBLICATIONS

Quigley et al. "Unionfs: User- and Community-Oriented Development of a Unification File System," Proceedings of the Linux Symposium, vol. Two, Jul. 19-22, 2006, Ottawa, Ontario, Canada, 16 pages.

* cited by examiner

*Primary Examiner* — Jacob D Dascomb
(74) *Attorney, Agent, or Firm* — Kim & Stewart LLP

(57) ABSTRACT

A virtualized application runs on top of a guest operating system (OS) of a virtual machine and is supported by a file system of the guest OS. The method of supporting the virtualized application with the file system includes provisioning a first virtual disk as a data store of the file system and a second virtual disk for the virtualized application, wherein the first and second virtual disks store first and second files of the virtualized application, respectively, retrieving metadata of the virtualized application, updating a master file table of the file system according to the retrieved metadata to map the first files to logical blocks of the file system, updating the master file table to map the second files to additional logical blocks according to the retrieved metadata, and creating a mapping for the additional logical blocks, that is used during an input/output operation, according to the retrieved metadata.

17 Claims, 5 Drawing Sheets

HYPERVISOR ASSISTED APPLICATION VIRTUALIZATION

BACKGROUND

In a remote desktop environment supported by virtual machines (VMs), the VMs are typically created using a master image (also referred to as "base image"). The master image contains a guest operating system (OS) and is used to create a pool of virtual machines. The Horizon View® product from VMware, Inc. provides the ability to create and manage such pool of virtual machines and their lifecycle. There are several options to create a pool, and one of them is to create a floating pool, i.e., any user accessing a VM may be redirected to any one of unoccupied VMs within the pool. These VMs are stateless and do not contain any applications or data specific to users.

Applications and data associated with the user may be delivered using application virtualization products, such as AppVolumes® from VMware, Inc. When a user logs into the VM, his or her data and applications get delivered to the stateless VM by attaching virtual disks. When these applications are delivered, the applications are not actually installed. Instead, an application volume containing files associated with each application is attached to the VM. A file system filter driver running inside the VM discovers all such application volumes and provides a unified view to the guest OS. The file system driver mainly provides two functions. One is to aggregate file systems and registries of multiple application volumes and the other is to redirect file and registry operations to the destination application volume. In such systems, the file system driver needs to look at multiple file systems to complete file and registry operations, resulting in performance overhead.

SUMMARY

One or more embodiments provide a technique for managing multiple application volumes that eliminates the overhead of performing multiple file system and registry operations. The technique employs a single file system namespace while serving data blocks for the applications (e.g., those relating to files, directories, and registry of the applications) from multiple application volumes, which reside in different disks.

In one embodiment where a virtualized application is to be executed on top of a guest operating system of a VM, a method of supporting the execution of the virtualized application includes the steps of provisioning a first virtual disk as a data store for a file system of the VM and a second virtual disk for the virtualized application, wherein the first virtual disk stores first files of the virtualized application and the second virtual disk stores second files of the virtualized application, retrieving metadata of the virtualized application, updating a master file table of the file system according to the retrieved metadata to map the first files to logical blocks of the file system, creating additional logical blocks of the file system and updating the master file table to map the second files to the additional logical blocks according to the retrieved metadata, and creating a mapping for the additional logical blocks according to master file table and the retrieved metadata. A filter driver residing in a hypervisor consults the mapping for the additional logical blocks to identify blocks of the second virtual disk corresponding to the additional logical blocks and direct input/output operations (IOs) targeting the additional logical blocks to the identified blocks of the second virtual disk.

Further embodiments include a non-transitory computer readable storage medium that includes instructions that enable a computer system to implement one or more aspects of the above method, as well as a remote desktop computer system configured to implement one or more aspects of the above method.

DETAILED DESCRIPTION

Figure 1:
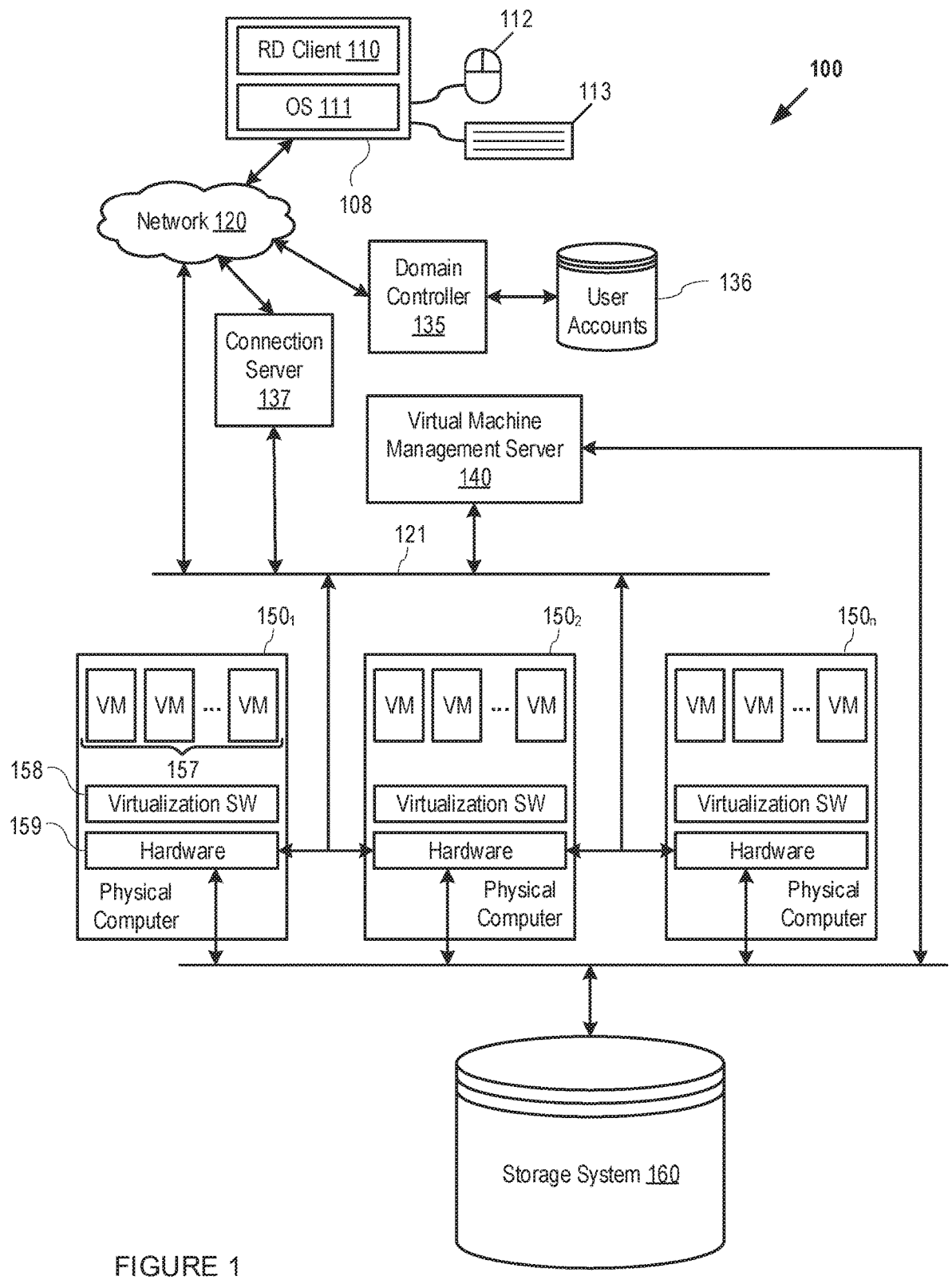
FIG. 1 illustrates components of a remote desktop computer system in which applications may be delivered to virtual machines according to one or more embodiments.

FIG. 1 illustrates components of a virtualized desktop infrastructure (VDI) system 100 (also referred to as a remote desktop computer system) in which applications may be delivered to virtual machines according to one or more embodiments. In VDI system 100, remote desktop client software programs (also referred to as "RD clients" for short) run on operating systems of local computing devices. In the embodiment illustrated in FIG. 1, RD client 110 runs on top of operating system (OS) 111 of client device 108. In addition, client device 108 has attached thereto a set of input devices including a mouse 112 and a keyboard 113. Alternatively or additionally, client device 108 may employ a touchscreen as an input device.

RD clients provide an interface for the users to access their desktops, which may be running in one of virtual machines 157 or blade server (not shown) in a data center that is remote from the user locations. The term, "desktop" refers to the instance of an interactive operating environment provided by a computer operating system and software applications, typically in the form of a display and sound output and keyboard and mouse input. With RD clients, users can access desktops running in a remote data center through network 120, from any location, using a general purpose computer running a commodity operating system and a RD client software program such as Horizon View®, or a special purpose thin client such as those available from Dell, HP, NEC, Sun Microsystems, Wyse, and others.

VDI system 100 includes a domain controller 135, such as Microsoft Active Directory®, that manages user accounts 136 including user log-in information, and a connection server 137 that manages connections between RD clients and desktops running in virtual machines 157 or other platforms. Domain controller 135 and connection server 137 may run on separate servers or in separate virtual machines running on the same server or different servers. In the embodiments illustrated herein, remote desktops are running in virtual machines 157 and virtual machines 157 are instantiated on a plurality of physical computers $150_1$, $150_2$, ..., $150_n$, each of which includes a hypervisor 158 (more generally, "virtualization software layer") and a hardware platform 159, is controlled by a virtual machine management server 140, and is coupled to a shared persistent storage system 160.

A particular configuration of the virtualized desktop infrastructure is described above and illustrated in FIG. 1, but it should be recognized that one or more embodiments may be practiced with other configurations of the virtualized desktop infrastructure.

Figure 2:
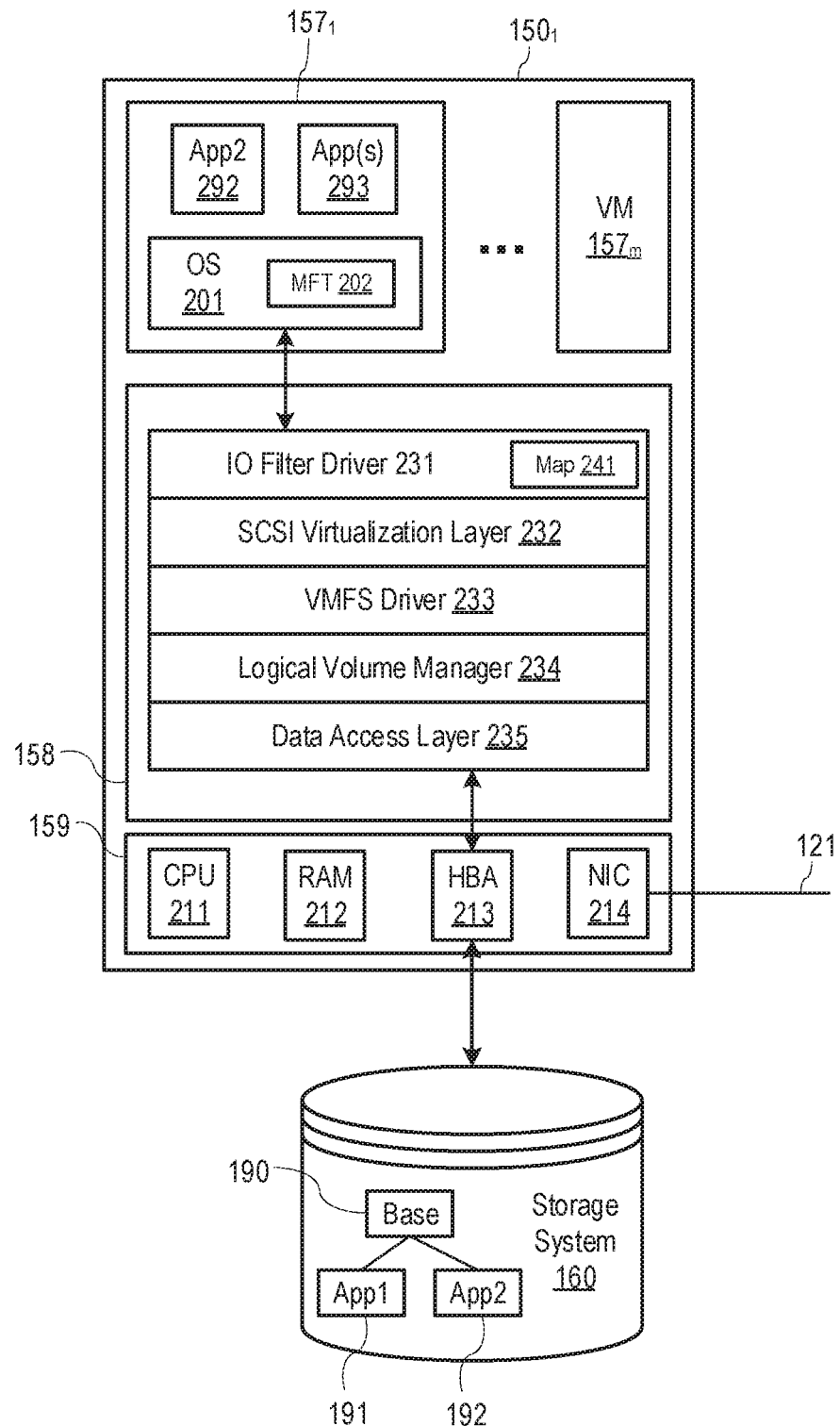
FIG. 2 is a block diagram illustrating additional details of a host computer in the remote desktop computer system of FIG. 1.

FIG. 2 is a block diagram illustrating additional details of a host computer for virtual machines 157 in VDI system 100. In the example of FIG. 2, physical computer $150_1$ is depicted as the host computer for VMs $157_1$ ... $157_m$. In addition, virtual machine $157_1$ is depicted as running a plurality of applications on top of guest OS 201. The applications include one or more virtualized applications (one of which is depicted as App2 292), and one or more other applications depicted as App(s) 293.

Guest OS 201 employs a file system to manage a data store for virtual machine $157_1$, which is, in the example of FIG. 2, a base virtual disk 190. Guest OS 201 maintains a master file table (MFT) 202, which is a table that stores information about every file and directory on the file system is stored.

Hardware platform 159 for the host computer includes one or more central processing units (CPU 211), system memory (RAM 212), one or more host bus adapters (HBA 213) that connect the host computer to persistent storage, illustrated herein as storage system 190, and one or more network interface controllers (NIC 214) that connect the host computer to network 121. Alternatively or additionally, persistent storage may be provided locally in host computer 100 or through the network by networked-attached storage (NAS) or virtual storage area network (VSAN).

As further shown in FIG. 2, hypervisor 158 is installed on top of hardware platform 159 and supports execution of VMs $157_1$ ... $157_m$. IOs issued by VMs $157_1$ ... $157_m$ are processed through an IO software stack in hypervisor 158 before they are issued through HBA 213 to storage system 190. At the top of the IO software stack is an IO filter driver 231 which examines the IOs to determine if they are targeting any logical blocks that have mappings in map 241. If so, the target logical blocks in such IOs are changed according to map 241. SCSI virtualization layer 232 receives the IOs from IO filter driver 231 and translates them into file operations directed at files representing base virtual disk 190, application virtual disk 191 for App1 (depicted as App1 191), and application virtual disk 192 for App2 (depicted as App2 192).

The remaining layers of the IO software stack are additional layers managed by hypervisor 158 to implement a clustered file system, referred to herein as virtual machine file system (VMFS), one example of which is described in U.S. Pat. No. 7,849,098, the entire contents of which are incorporated by reference herein. VMFS driver 233, converts the file operations received from SCSI virtualization layer 232 to block IOs that are provided to logical volume manager (LVM) 234. LVM 234 generates raw SCSI commands from the block IOs and provides them to data access layer 235. Data access layer 235 includes a device access layer, which discovers storage system 160, and applies command queuing and scheduling policies to the raw SCSI commands, and a device driver, which understands the input/output interface of HBAs 213 interfacing with storage system 160, and sends the raw SCSI commands to HBAs 213 to be forwarded to storage system 160.

It should be recognized that the various terms, layers and categorizations used to describe the virtualization components in FIG. 2 may be referred to differently without departing from their functionality or the spirit or scope of the invention. It should also be recognized that the techniques described herein are also applicable to hosted virtualized computer systems.

In the embodiments described herein, an application is virtualized in two phases. The first phase is referred to herein as "application capture," during which all of the application data and file system metadata will be captured in a delta disk. The second phase is referred to herein as "application delivery," during which an application's file system metadata is merged into the file system of a VM and a map for redirecting target logical blocks in IOs to logical blocks of the delta disk is created.

Figure 3A:
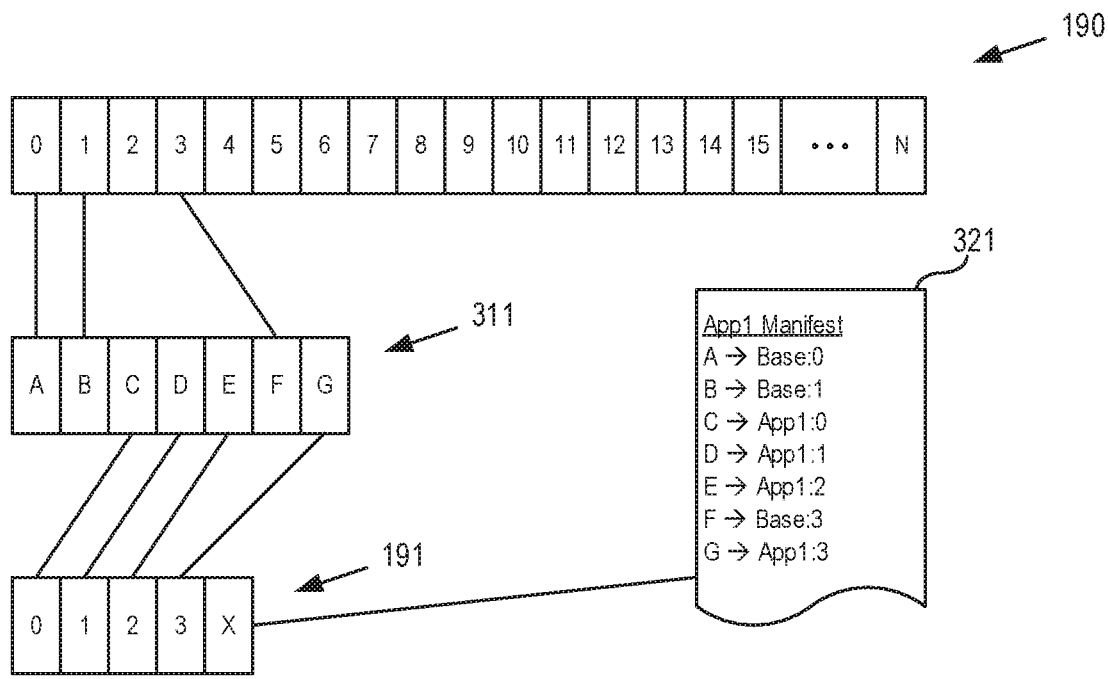
FIGS. 3A and 3B illustrate how files of different applications are mapped to a base virtual disk and a respective application virtual disk and application manifest files that describe the mappings.
Figure 3B:
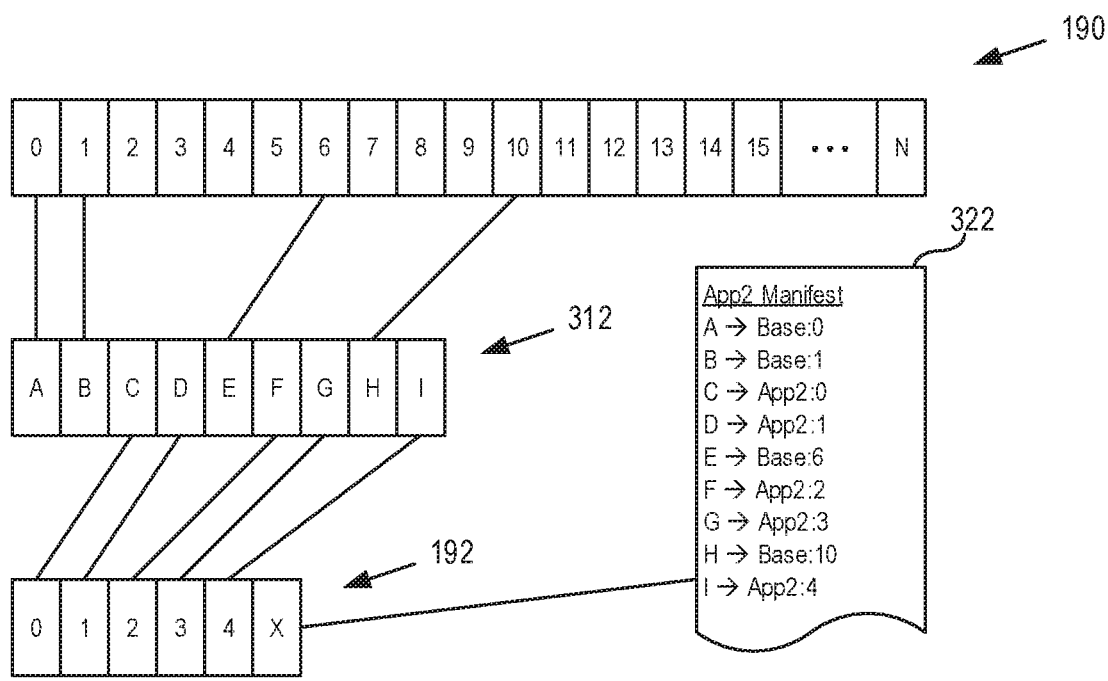

FIGS. 3A and 3B illustrate how files of different applications (identified as App1 and App2 in the embodiments illustrated herein) are mapped to a base virtual disk and a respective application virtual disk during the application capture phase. Once an application is captured, the application can be delivered to one or more VMs in accordance with the process described in conjunction with FIGS. 4A, 4B, and 5.

FIGS. 3A and 3B also illustrate application manifest files that contain the file system metadata that describe the mappings for the files as well as other file metadata information such as file size, security attributes, timestamp, access control labels, etc. The mappings for the files illustrated herein assume (for simplicity in description) that one file occupies one logical block on a virtual disk. However, it should be recognized by those skilled in the art that one file in actual implementations maps to one or more logical blocks according to its file size and the unit size of the logical blocks.

FIG. 3A illustrates a logical block address space of base virtual disk 190, a logical block address space of an application virtual disk 191, and a file system namespace 311 for App1, and how files in file system namespace 311 map to logical blocks of base virtual disk 190 and application virtual disk 191. The mappings of the files in file system namespace 311 to logical blocks of base virtual disk 190 and application virtual disk 191 are stored in the manifest file, App1 manifest 321.

In FIG. 3A, it is assumed that App1 has files whose contents are stored in base virtual disk 190. These files are shown as files A, B, and F. For files whose contents are not stored in base virtual disk 190, namely files C, D, E, and G, their contents are captured in application virtual disk 191. Application virtual disk 191 is thinly provisioned, which means that disk space of application virtual disk 191 is allocated only as needed. Once App1 is captured in application virtual disk 191, application virtual disk 191 is preserved as an application volume for App1 and App1 manifest 321 is generated and stored in application virtual disk 191 as the manifest file for App1.

FIG. 3B illustrates a logical block address space of base virtual disk 190, a logical block address space of an application virtual disk 192, and a file system namespace 312 for App2, and how files in file system namespace 312 map to logical blocks of base virtual disk 190 and application virtual disk 192. The mappings of the files in file system namespace 312 to logical blocks of base virtual disk 190 and application virtual disk 192 are stored in the manifest file, App2 manifest 322.

In FIG. 3B, it is assumed that App2 has files whose contents are stored in base virtual disk 190. These files are shown as files A, B, E, and H. For files whose contents are not stored in base virtual disk 191, namely files C, D, F, G, and I, their contents are captured in application virtual disk 192. Application virtual disk 192 is thinly provisioned, which means that disk space of application virtual disk 192 is allocated only as needed. Once App2 is captured in application virtual disk 192, application virtual disk 192 is preserved as an application volume for App2, and App2 manifest 321 is generated and stored in application virtual disk 192 as the manifest file for App2.

Other virtualized applications may be captured in the above manner described for App1 and App2. Each of the applications is typically captured in a separate application virtual disk for simplifying their lifecycle management.

Figure 4A:
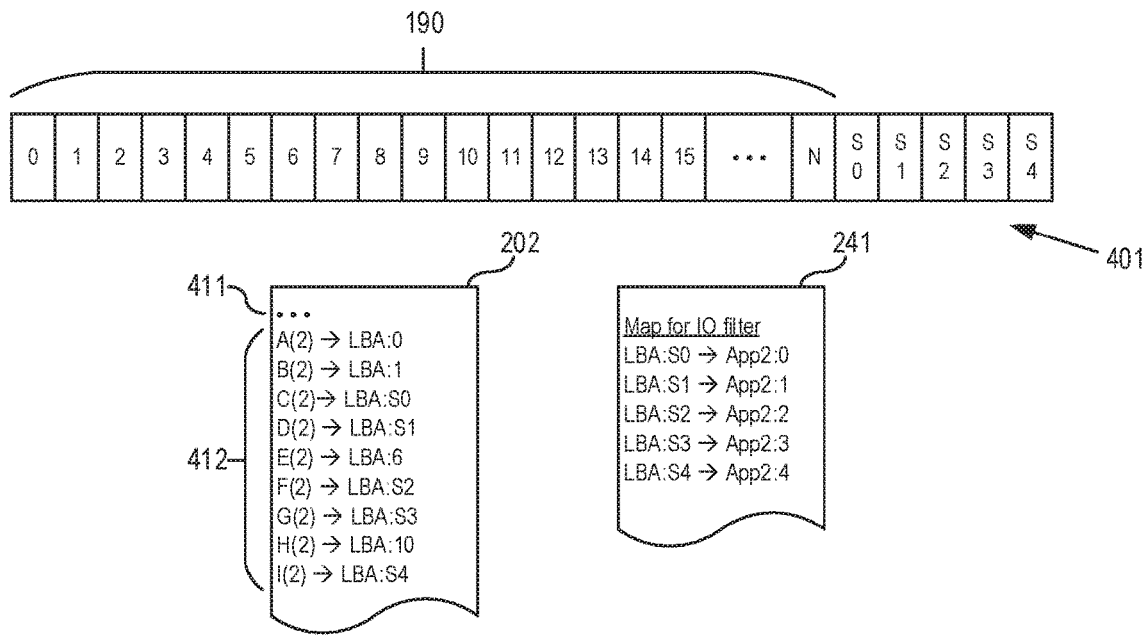
FIG. 4A depicts a simplified master file table managed by a guest operating system of a virtual machine to which one application has been delivered.

FIG. 4A depicts a simplified MFT managed by a guest OS of a VM to which one application, e.g., App2, has been delivered. As described above, MFT is a table that stores information about every file and directory on the file system of the guest OS. In the example of FIG. 4A, MFT 202 stores mappings 411 of all files on the file system of guest OS 201 to logical blocks (0, 1, 2, . . . , N) of a logical block address space 401, which is created when base virtual disk 190 is attached to the VM. Thus, logical blocks of only base virtual disk 190 are initially allocated in logical block address space 401, and mappings 411 describe how the files on the file system of guest OS 201 are mapped to the logical blocks of base virtual disk 190 in logical address space 401.

Upon delivery of the application, App2, logical block address space 401 is extended to include additional blocks, referred to herein as "shadow blocks," and mappings 412 of all files of App2, identified as A(2), . . . , I(2), to logical blocks of logical block address space 401, both originally allocated logical blocks and shadow blocks, are stored in MFT 202. As illustrated in FIG. 4A, mappings 412 indicate that files A(2), B(2), E(2), and H(2) are respectively mapped to logical blocks 0, 1, 6, and 10 of logical block address space 401, and that C(2), D(2), F(2), G(2), and I(2) are respectively mapped to shadow blocks S0, S1, S2, S3, and S4 of logical block address space 401.

FIG. 4A also depicts a map 241 that is created upon delivery of the application, App2. Map 241 stores mappings of shadow blocks of logical block address space 401 to logical blocks of a logical block address space of the application virtual disk for App2, namely application virtual disk 192. When an IO is issued by guest OS 201 and the IO targets one or more of the shadow blocks, IO filter driver 231 modifies the IO according to map 241 so that the IO targets logical blocks in the logical block address space of application virtual disk 192 instead of the shadow blocks. Thus, if an IO targets shadow block S2, IO filter driver 231 would modify the IO to target logical block 2 of application virtual disk 192 instead of shadow block S2.

Figure 4B:
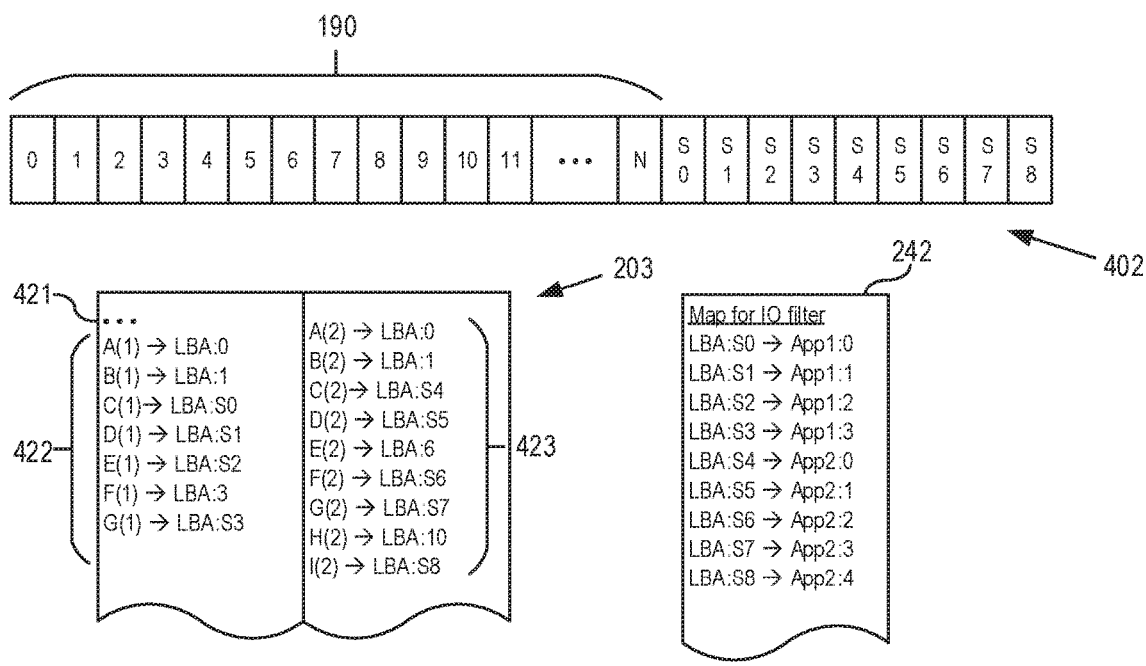
FIG. 4B depicts a simplified master file table managed by a guest operating system of a virtual machine to which two applications have been delivered.

FIG. 4B depicts a simplified MFT managed by a guest OS of a VM to which two applications, e.g., App1 and App2, have been delivered. In the example of FIG. 4B, MFT 203 stores mappings 421 of all files on the file system of guest OS 201 to logical blocks (0, 1, 2, . . . , N) of a logical block address space 402, which is created when base virtual disk 190 is attached to the VM. Thus, logical blocks of only base virtual disk 190 are initially allocated in logical block address space 402, and mappings 421 describe how the files on the file system of guest OS 201 are mapped to the logical blocks of base virtual disk 190 in logical address space 402.

Upon delivery of the applications, App1 and App2, logical block address space 402 is extended to include additional blocks, referred to herein as shadow blocks, and mappings 422 of all files of App1, identified as A(1), . . . , H(1), and mappings 423 of all files of App2, identified as A(2), . . . , H(2), to logical blocks of logical block address space 402, both originally allocated logical blocks and shadow blocks, are stored in MFT 203. As illustrated in FIG. 4B, mappings 422 indicate that files A(1), B(1), and F(1) are respectively mapped to logical blocks 0, 1, and 3 of logical block address space 401, and that C(1), D(1), E(1), and G(1) are respectively mapped to shadow blocks S0, S1, S2, and S3 of logical block address space 402. In addition, mappings 423 indicate that files A(2), B(2), E(2), and H(2) are respectively mapped to logical blocks 0, 1, 6, and 10 of logical block address space 402, and that C(2), D(2), F(2), G(2), and I(2) are respectively mapped to shadow blocks S4, S5, S6, S7, and S8 of logical block address space 402.

FIG. 4B also depicts a map 242 that is created upon delivery of the applications, App1 and App2. Map 242 stores mappings of shadow blocks of logical block address space 401 to logical blocks of application virtual disk 191 and application virtual disk 192. When an IO is issued by guest OS 201 and the IO targets one or more of the shadow blocks, IO filter driver 231 modifies the IO according to map 242 so that the IO targets logical blocks in the logical block address space of either application virtual disk 191 or application virtual disk 192 instead of the shadow blocks. Thus, if an IO targets shadow block S3, IO filter driver 231 would modify the IO to target logical block 3 of application virtual disk 191 instead of shadow block S3. Similarly, if an IO targets shadow block S4, IO filter driver 231 would modify the IO to target logical block 0 of application virtual disk 192 instead of shadow block S4.

Figures 5, 6:
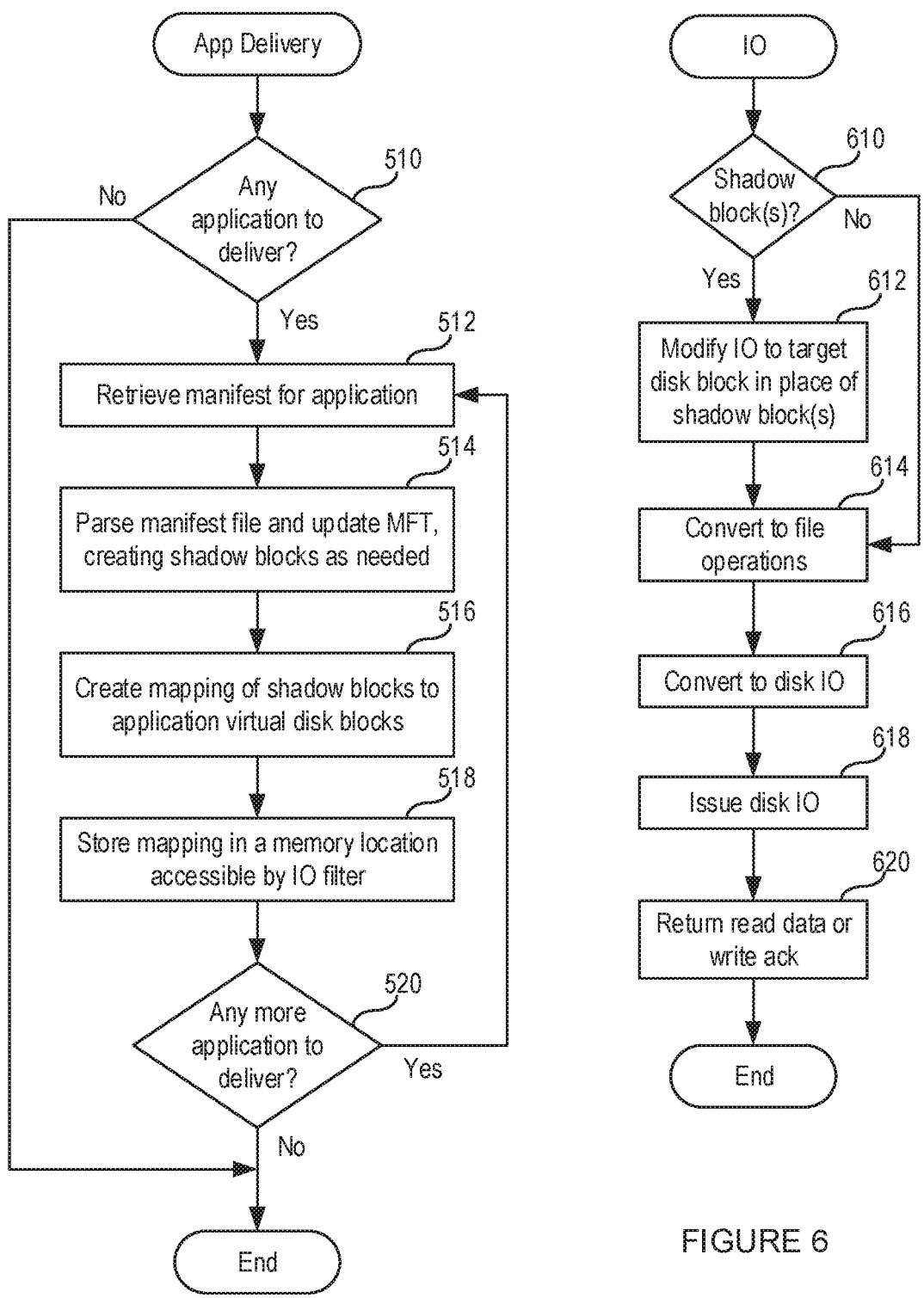
FIG. 5 is a flow diagram illustrating steps of delivering one or more applications to a virtual machine.
FIG. 6 is a flow diagram illustrating steps of performing an input/output operation issued by a virtual machine to which one or more applications have been delivered.

FIG. 5 is a flow diagram illustrating steps of the application delivery process. The steps of FIG. 5 are carried out by VM management server 140 upon receiving a connection request to a VM from connection server 137.

The application delivery process begins at step 510 where VM management server 140 determines whether or not there are any applications to deliver to the VM of the user submitting the connection request. If there are none, the process ends. If there is one, VM management server 140 at step 512 retrieves the manifest file for the application from the application's virtual disk. At step 514, VM management server 140 parses the manifest file and updates the MFT managed by the guest OS of the VM, creating shadow blocks as needed in the manner described above in conjunction with FIGS. 4A and 4B. Then, VM management server 140 at step 516 creates a map (e.g., map 241 or map 242) that contains mappings from shadow blocks to logical blocks of a virtual disk of the application being delivered, and at step 518 stores the map in a memory location accessible by IO filter driver 231. After step 518, VM management server 140 determines at step 520 whether or not there are additional applications to deliver. If there are, steps 512, 514, 516, and 518 are repeated to deliver another application. The process ends if there are no more applications to deliver.

FIG. 6 is a flow diagram illustrating steps of performing an IO issued by a VM to which one or more applications have been delivered. The steps of FIG. 6 are carried out by a hypervisor that supports the VM upon receipt of the IO issued by the VM.

IO processing begins at step 610 where the hypervisor, in particular IO filter driver 231, determines whether or not the IO targets any shadow blocks. If there are any, IO filter driver 231 at step 612 modifies the IO to target application disk blocks in place of the shadow blocks. In performing step 612, IO filter driver 231 consults a map (e.g., map 241 if App2 has been delivered to the VM or map 242 if App1 and App2 have been delivered to the VM) to first identify the application disk blocks corresponding to the shadow blocks, and then modifies the IO to target the identified application disk blocks.

IO processing continues at step 614, where SCSI virtualization layer 232 converts the IO into file operations. The IO converted at step 614 may be the IO modified at step 612 or IO issued by the VM if the IO issued by the VM did not target any shadow blocks (Step 610, No). Then, the hypervisor at step 616 converts the file operations to IOs directed to logical blocks of a disk device provisioned for the hypervisor and at step 618 issues the IOs to the disk device. When read data is returned in response to a read IO or a write acknowledgement is returned in response to a write IO, the hypervisor at step 620 returns the read data or the write acknowledgement to the VM.

Embodiments allow applications to be delivered without modification to stateless VMs when the base image used for the remote desktop migrates to a newer or older version after the applications have been captured. This is because the master file table will be rearranged during application delivery as described above, and the application does not need to be recaptured with the updated base image.

As used herein, a "connection server" is any apparatus that is configured to manage connections to remote user sessions such as remote desktops and is also referred to as a "connection broker," and a "domain controller" is any apparatus that is configured to have access to and manage user log-in information.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments, may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method of supporting a virtualized application for execution on top of a guest operating system of a virtual machine that has a file system managed by the guest operating system, wherein the virtual machine runs on top of a hypervisor that includes a filter driver for processing input/output operations (IOs) of the virtual machine, said method comprising:

provisioning a first virtual disk for the file system of the virtual machine and a second virtual disk for the virtualized application, wherein the first virtual disk stores first files of the virtualized application and the second virtual disk stores second files of the virtualized application;

retrieving metadata of the virtualized application, the metadata mapping the first files to first logical blocks on the first virtual disk and the second files to second logical blocks on the second virtual disk;
updating a master file table of the file system according to the retrieved metadata to map the first files to the first logical blocks;
creating additional logical blocks on the first virtual disk and updating the master file table to map the second files to the additional logical blocks according to the retrieved metadata, the additional logical blocks being shadow blocks; and
creating a mapping for the additional logical blocks according to the master file table and the retrieved metadata such that the additional logical blocks are mapped to the second logical blocks, wherein the filter driver, when processing the IOs, consults the mapping for the additional logical blocks to identify the second logical blocks of the second virtual disk corresponding to the additional logical blocks.

2. The method of claim 1, wherein the metadata of the virtualized application is stored in the second virtual disk and retrieved from the second virtual disk.

3. The method of claim 1, wherein the first virtual disk is a base virtual disk that is shared with other virtual machines, and the second virtual disk is an application virtual disk that is shared with other virtual machines.

4. The method of claim 3, wherein the second virtual disk is provisioned exclusively for the virtualized application.

5. The method of claim 1, further comprising:
upon detecting that a command from the virtual machine targets one of the additional logical blocks, consulting the mapping to identify the second logical blocks of the second virtual disk corresponding to the additional logical blocks, and reissuing the command to target the identified blocks of the second virtual disk.

6. The method of claim 1, wherein the first and second disks are provisioned in response to a user logging into a desktop that is supported by the virtual machine.

7. A non-transitory computer readable medium storing instructions executable in a computer system, wherein the instructions when executed in the computer system cause the computer system to carry out a process to support execution of a virtualized application on top of a guest operating system of a virtual machine that has a file system managed by the guest operating system, said method comprising:
provisioning a first virtual disk for the file system of the virtual machine and a second virtual disk for the virtualized application, wherein the first virtual disk stores first files of the virtualized application and the second virtual disk stores second files of the virtualized application;
retrieving metadata of the virtualized application, the metadata mapping the first files to first logical blocks on the first virtual disk and the second files to second logical blocks on the second virtual disk;
updating a master file table of the file system according to the retrieved metadata to map the first files to the first logical blocks;
creating additional logical blocks of the on the first virtual disk and updating the master file table to map the second files to the additional logical blocks according to the retrieved metadata, the additional logical blocks being shadow blocks; and
creating a mapping for the additional logical blocks according to the master file table and the retrieved metadata such that the additional logical blocks are mapped to the second logical blocks, wherein the mapping for the additional logical blocks is consulted during processing of input/output operations (IOs) of the virtual machine to identify the second logical blocks of the second virtual disk corresponding to the additional logical blocks.

8. The non-transitory computer readable medium of claim 7, wherein the metadata of the virtualized application is stored in the second virtual disk and retrieved from the second virtual disk.

9. The non-transitory computer readable medium of claim 7, wherein the first virtual disk is a base virtual disk that is shared with other virtual machines, and the second virtual disk is an application virtual disk that is shared with other virtual machines.

10. The non-transitory computer readable medium of claim 9, wherein the second virtual disk is provisioned exclusively for the virtualized application.

11. The non-transitory computer readable medium of claim 7, wherein the method further comprises:
upon detecting that a command from the virtual machine targets one of the additional logical blocks, consulting the mapping to identify the second logical blocks of the second virtual disk corresponding to the additional logical blocks, and reissuing the command to target the identified blocks of the second virtual disk.

12. The non-transitory computer readable medium of claim 7, wherein the first and second disks are provisioned in response to a user logging into a desktop that is supported by the virtual machine.

13. A computer system comprising:
a host computer having a virtualization software layer that supports a running virtual machine having a guest operating system and a virtualized application running on top of the guest operating system;
a first virtual disk provisioned for the file system of the virtual machine, wherein the first virtual disk stores first files of the virtualized application; and
a second virtual disk provisioned for the virtualized application, wherein the second virtual disk stores second files of the virtualized application;
wherein the guest operating system maintains a master file table that maps the first files to first logical blocks of the first virtual disk, and the second files to additional logical blocks of the first virtual disk, and
wherein the virtualization software layer maintains a mapping of the additional logical blocks to second logical blocks of the second virtual disk, the additional logical blocks being shadow blocks.

14. The computer system of claim 13, wherein the first virtual disk is a base virtual disk that is shared with other virtual machines, and the second virtual disk is an application virtual disk that is shared with other virtual machines.

15. The computer system of claim 14, wherein the second virtual disk is provisioned exclusively for the virtualized application.

16. The computer system of claim 13, wherein the virtualization software layer is configured to perform an input/output operation (TO) in response to a command from the virtual machine, the IO including the step of:
upon detecting that the command from the virtual machine targets one of the additional logical blocks, consulting the mapping to identify the second logical blocks of the second virtual disk corresponding to the additional logical blocks, and reissuing the command to target the identified blocks of the second virtual disk.

17. The computer system of claim 13, wherein the first and second disks are provisioned in response to a user logging into a desktop that is supported by the virtual machine.

* * * * *